O. F. WOODWARD.
Process of Making Target-Balls.

No. 219,557.  Patented Sept. 9, 1879.

Attest.
R. F. Osgood
R. E. White

Inventor.
O. F. Woodward

UNITED STATES PATENT OFFICE.

ORATOR F. WOODWARD, OF LE ROY, NEW YORK, ASSIGNOR OF ONE-HALF HIS RIGHT TO FRANCIS C. LATHROP, OF SAME PLACE.

IMPROVEMENT IN PROCESSES OF MAKING TARGET-BALLS.

Specification forming part of Letters Patent No. 219,557, dated September 9, 1879; application filed May 8, 1879.

*To all whom it may concern:*

Be it known that I, ORATOR F. WOODWARD, of Le Roy, in the county of Genesee and State of New York, have invented a certain new and useful Improvement in Processes or Methods of Making Target-Balls; and I do hereby declare that the following is a full, clear, and exact description of the same, reference being had to the accompanying drawings, in which—

Figure 1:
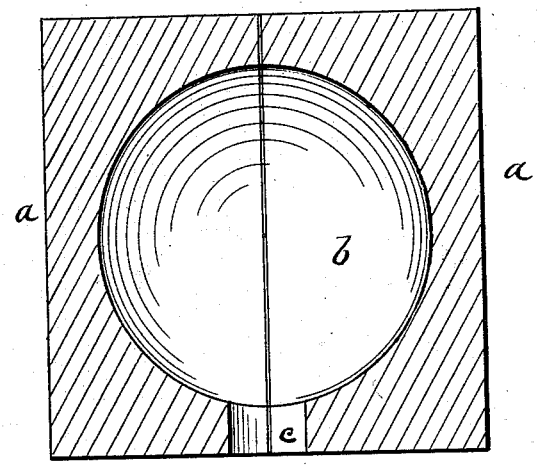
Figure 2:
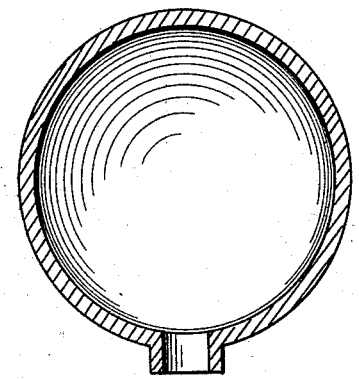

Figure 1 is a vertical section of the mold in which the balls are formed. Fig. 2 is a similar view of one of the finished balls.

My improvement relates to the means of forming target-balls of brimstone or any other fusible or liquid material; and consists in the method of pouring the said material, in the fused or liquid state, into a hollow mold, allowing the same to cool and harden sufficiently to form the desired thickness of shell, and then pouring out the contents or the remainder of the fused material, leaving thereby a hollow globe, which can be removed by opening the mold.

In the drawings, *a a* represent the two halves of the mold, which have the hollow matrix *b*, with passage *c*, leading outside, and through which the material is poured. The parts of the mold are held together by dowels or otherwise, so as to be easily separable.

The material of which the balls are made is first fused, so as to be in liquid form and run easily. The mold is then filled with the liquid material and allowed to stand till a crust or shell has formed on the outer surface within the mold of sufficient thickness to give the necessary strength and substance to the ball. This may be determined by the appearance of the cooling material at the orifice. When sufficient thickness of the shell is attained the mold is inverted or turned upside down, as shown in Fig. 1, and all the material which still remains fused, and which occupies the center of the mold, is quickly turned out, which leaves a hollow globular shell of the form shown in Fig. 2.

This is a simple, rapid, and convenient method of forming hollow target-balls, and the only one I am acquainted with that is practicable with the use of such material as brimstone, as it allows proper expansion and contraction in cooling, and therefore prevents the breakage that would occur if it were attempted to cast by coring, as is done in metals.

A series of the single molds may be combined in a single plate or compound mold to enable the work to be done rapidly.

What I claim as new, and desire to secure by Letters Patent, is—

The process or method herein described of forming target-balls, which consists in fusing the material, pouring the same into a hollow mold, allowing the same to stand in the mold till a shell has formed on the outside, and then pouring out the remaining fused or liquid material, leaving thereby a hollow ball, as herein shown and described.

In witness whereof I have hereunto signed my name in the presence of two subscribing witnesses.

O. F. WOODWARD.

Witnesses:
R. F. OSGOOD,
R. E. WHITE.